US012687762B2

(12) United States Patent
Song

(10) Patent No.: US 12,687,762 B2
(45) Date of Patent: Jul. 21, 2026

---

(54) CAMERA MODULE AND MOVING DEVICE

(71) Applicant: LG INNOTEK CO., LTD., Seoul (KR)

(72) Inventor: Yun Sang Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 506 days.

(21) Appl. No.: 18/030,201

(22) PCT Filed: Oct. 5, 2021

(86) PCT No.: PCT/KR2021/013579
§ 371 (c)(1),
(2) Date: Apr. 4, 2023

(87) PCT Pub. No.: WO2022/075682
PCT Pub. Date: Apr. 14, 2022

(65) Prior Publication Data
US 2024/0027877 A1 Jan. 25, 2024

(30) Foreign Application Priority Data

Oct. 5, 2020 (KR) ........................ 10-2020-0127799

(51) Int. Cl.
*G03B 13/36* (2021.01)
(52) U.S. Cl.
CPC .................................... *G03B 13/36* (2013.01)
(58) Field of Classification Search
CPC . G03B 5/06; G03B 2205/0023; G02B 27/642
See application file for complete search history.

(56) References Cited

U.S. PATENT DOCUMENTS

| | | | |
|---|---|---|---|
| 9,596,394 B2 | 3/2017 | Chung et al. | |
| 10,348,968 B2 | 7/2019 | Sekimoto | |

(Continued)

FOREIGN PATENT DOCUMENTS

| | | |
|---|---|---|
| CN | 102890328 A | 1/2013 |
| CN | 105637399 A | 6/2016 |

(Continued)

OTHER PUBLICATIONS

English language machine translation of Terajima JP-2013025035-A (Year: 2013).*

*Primary Examiner* — Marin Pichler

(74) *Attorney, Agent, or Firm* — Birch, Stewart, Kolasch & Birch, LLP

(57) ABSTRACT

A camera module disclosed in an embodiment of the present invention may include a lens holder having at least one lens; a case spaced apart from an outside of the lens holder; a plurality of first elastic springs having one end connected to the lens holder and the other end connected to the case; a driving member disposed to be adjacent to the lower part of the lens holder; a plurality of guide portions which have inner side surfaces facing the lower part of the lens holder, and which are spaced apart from each other; and a plurality of second elastic springs for connecting each of the plurality of guide portions to the case, wherein the driving member may include a plurality of stators disposed on a substrate, and a plurality of movers which face the respective plurality of stators and which are disposed on lower surfaces of the plurality of guide portions.

17 Claims, 5 Drawing Sheets

(56)         References Cited

U.S. PATENT DOCUMENTS

| | | |
|---|---|---|
| 2010/0328791 A1 | 12/2010 | Jung et al. |
| 2015/0036231 A1 | 2/2015 | Terajima |
| 2016/0212312 A1 | 7/2016 | Chung et al. |
| 2016/0255276 A1 | 9/2016 | Sekimoto |
| 2020/0218082 A1* | 7/2020 | Choi ..................... H04N 23/57 |
| 2022/0086317 A1 | 3/2022 | Paik et al. |

FOREIGN PATENT DOCUMENTS

| | | |
|---|---|---|
| CN | 106461909 A | 2/2017 |
| EP | 2 099 030 A1 | 9/2009 |
| JP | 2008-187839 A | 8/2008 |
| JP | 2013-25035 A | 2/2013 |
| JP | 2013025035 A * | 2/2013 |
| JP | 6283480 B2 | 2/2018 |
| KR | 10-2005-0103348 A | 10/2005 |
| KR | 10-2008-0044525 A | 5/2008 |
| KR | 10-2009-0083123 A | 8/2009 |
| KR | 10-2009-0095455 A | 9/2009 |
| KR | 10-2010-0068701 A | 6/2010 |
| KR | 10-2011-0094232 A | 8/2011 |
| KR | 10-2015-0051098 A | 5/2015 |
| KR | 10-2018-0101705 A | 9/2018 |
| KR | 10-2020-0086077 A | 7/2020 |

* cited by examiner

CAMERA MODULE AND MOVING DEVICE

CROSS REFERENCE TO RELATED APPLICATIONS

This application is the National Phase of PCT International Application No. PCT/KR2021/013579, filed on Oct. 5, 2021, which claims priority under 35 U.S.C. 119 (a) to Patent Application No. 10-2020-0127799, filed in the Republic of Korea on Oct. 5, 2020, all of which are hereby expressly incorporated by reference into the present application.

TECHNICAL FIELD

An embodiment of the invention relates to a camera module and a moving device having the same.

BACKGROUND ART

As smart phones or tablet PCs become popular, camera modules mounted on portable terminals such as the smart phones or tablet PCs are replacing portable cameras (digital cameras, etc.). Accordingly, users take it for granted that a high-spec camera is mounted on a portable terminal. As the development of camera modules with high-resolution sensors is rapidly increasing and multifunctional smart phones such as high-magnification phones and foldable phones are being developed, a part of the camera module is protruding, and there are demands to reduce the height of the camera module with high magnification. Recently, the camera module is applied to a mobile device such as a smart phone and a vehicle. In addition, functions capable of shifting or tilting an auto focus (AF) function of the camera module of a portable terminal and a lens holder are required.

DISCLOSURE

Technical Problem

An embodiment of the invention may provide a camera module having a member for controlling auto focus, horizontal shift, and tilt of a lens holder. An embodiment of the invention may provide a camera module having a structure capable of supporting auto focus with respect to a lens holder and capable of shifting and tilting in a horizontal direction. An embodiment of the invention may provide a moving device such as a mobile terminal or a vehicle having a camera module.

Technical Solution

A camera module according to an embodiment of the invention includes a lens holder having at least one lens; a case spaced apart from an outer side of the lens holder; a plurality of first elastic springs having one end connected to the lens holder and the other end connected to the case; a plurality of driving members disposed around a lower portion of the lens holder; and a plurality of guide portions having an inner side surface facing the lower portion of the lens holder and arranged along an outer periphery of the lens holder, and a plurality of second elastic springs connecting each of the plurality of guide portions to different positions of the case, wherein each of the plurality of driving members may include a stator and a mover disposed on each of the plurality of guide portions and facing the stator.

According to an embodiment of the invention, the substrate; an image sensor aligned with the lens in an optical axis on the substrate may be included. The plurality of stators may be coils, and the plurality of movers may be magnets. The inner side surface of each of the plurality of guide portions has an inclined surface with an upper end higher than a lower end, the inner side surfaces of the plurality of guide portions may face each other, and a distance between the upper ends of the inner side surfaces facing each other may be smaller than a distance between the lower ends. The plurality of first elastic springs may be three or four, and the plurality of second elastic springs may be three or four.

According to an embodiment of the invention, the lens holder may be moved up or down in a direction of an optical axis by the driving member. The lens holder may be moved in a horizontal direction based on the optical axis by the driving members. The lens holder may be tilted based on the optical axis by the driving members. The inner side surfaces of the guide portions may have a length in a radial direction ranging from 0.4 mm to 0.7 mm.

A camera module according to an embodiment of the invention includes a substrate having an image sensor; a lens holder disposed on the image sensor and having a plurality of lenses; a case disposed around the lens holder; a plurality of first elastic springs connected between the lens holder and the case; a plurality of guide portions disposed between the lens holder and the case; a plurality of driving members for driving each of the plurality of guide portions; and a plurality of second elastic springs connected between each of the plurality of guide portions and the case, wherein each of the plurality of driving members may be individually driven.

According to an embodiment of the invention, each of the plurality of guide portions has an inclined inner side surface overlapping the lower end of the lens holder in an optical axis direction, and the plurality of driving members may include a plurality of stators and a plurality of movers coupled to each of the plurality of guide portions and facing each of the stators, a number of the plurality of guide portions, the plurality of driving members, the first elastic springs and the second elastic springs is two or more, and may be disposed in the same number as each other.

A moving device according to an embodiment of the invention may include the camera module.

Advantageous Effects

The camera module according to the embodiment of the invention may have functions of auto focus, horizontal movement of the lens holder, and/or tilting the lens holder. The camera module according to an embodiment of the invention has an effect of adjusting each function by using a driving member, a guide portion, and an elastic spring without increasing the overall length. Reliability of a camera lens module and a moving device having the camera lens module according to an embodiment of the invention may be improved.

BEST MODE

Figure 1:
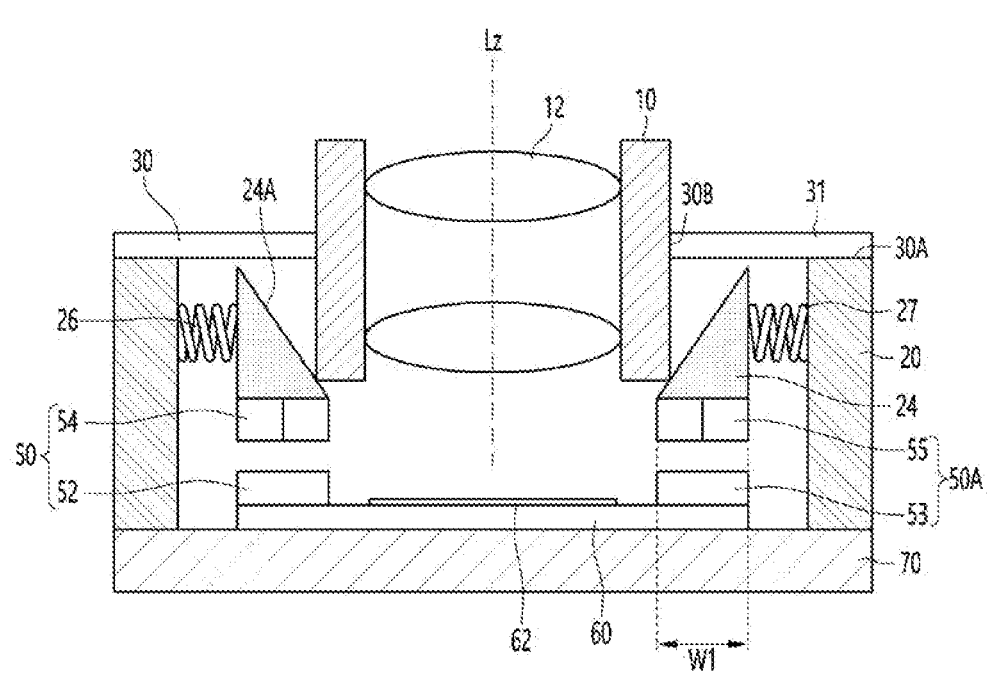
FIG. 1 is a side cross-sectional view of a camera module according to an embodiment of the invention.

Hereinafter, preferred embodiments of the invention will be described in detail with reference to the accompanying drawings. The technical idea of the invention is not limited to some of the described embodiments, but can be implemented in various different forms, and if it is within the scope of the technical idea of the invention, one or more of its components may be selectively combined and substituted between embodiments. In addition, terms (including technical and scientific terms) used in the embodiments of the invention, unless explicitly specifically defined and described, may be interpreted as a meaning that may be generally understood by those skilled in the art to which the invention belongs, and terms generally used, such as terms defined in the dictionary, may be interpreted in consideration of the context of the related technology. Also, terms used in the embodiments of the invention are for describing the embodiments and are not intended to limit the invention. In the present specification, the singular form may include a plural form unless specifically described in the phrase, and may include at least one of all combinations that may be combined as A, B, and C when described as "A and/or at least one (or more than one) of B and C". Also, terms such as first, second, A, B, (a), and (b) may be used to describe components of an embodiment of the invention. These terms are intended only to distinguish the components from other components and are not determined by their nature, sequence, or order. Also, when a component is described as being 'connected', 'coupled' or 'connected' to another component, not only when the component is directly connected, coupled or connected to another component, it may also be 'connected', 'coupled', or 'connected' due to another component between that component and the other component. In addition, when each component is described as being formed or disposed "up (above) or down (bottom)", the up (down) or down (bottom) includes not only when two components are in direct contact with each other, but also when one or more components are formed or disposed between two components. Also, when expressed as "up (above) or down (bottom)", it may include the meaning of not only the upward direction but also the downward direction based on one component.

The 'optical axis direction' used below is defined as a direction of the optical axis of the lens of the camera device. In this case, the optical axis of the lens may correspond to the optical axis of the image sensor. Meanwhile, the 'optical axis direction' may correspond to an 'up and down direction' or a 'z-axis direction'. The 'auto focus function' used below is defined as a function that automatically focus on the subject by moving the lens in the optical axis direction according to the distance of the subject so that a clear image of the subject may be obtained in the image sensor. Meanwhile, 'auto focus' may be used interchangeably with 'AF'. The 'hand shake correction function' used below is defined as a function of moving or tilting a lens in a direction perpendicular to the optical axis direction to offset vibration (movement) generated in the image sensor by an external force. Meanwhile, 'hand shake correction' may be used interchangeably with 'optical image stabilization (OIS)'.

Hereinafter, "dual or triple camera" and "camera device" may be used interchangeably. That is, the camera device may be described as including two or three or more lens modules. Optical devices may include any one of cell phones, cell phones, smart phones, portable smart devices, digital cameras, laptop computers, digital broadcasting terminals, personal digital assistants (PDA), portable multimedia players (PMPs), camera device for vehicle, and a navigation. However, a type of optical device is not limited thereto, and any device for taking a video or photo may be included in the optical device. The optical device may include a main body. The main body may form the appearance of the optical device. The main body may accommodate a camera device. A display portion may be disposed on one surface of the main body. For example, a display portion and a camera device may be disposed on one surface of the main body, and a camera device may be additionally disposed on the other surface (a surface positioned opposite to the one surface) of the main body. The optical device may include a display portion. The display portion may be disposed on one surface of the main body. The display portion may output an image photographed by the camera device. The optical device may include a camera device. The camera device may be disposed on the main body. At least a part of the camera device may be accommodated inside the main body. A plurality of camera devices may be provided. The camera device may be disposed on one surface of the main body and the other surface of the main body. The camera device may capture an image of a subject. The camera device may include a lens driving device. The lens driving device may be a lens driving motor or a voice coil motor. The camera device may include at least one or both of an AF actuator and an OIS actuator.

Embodiment

Figure 2:
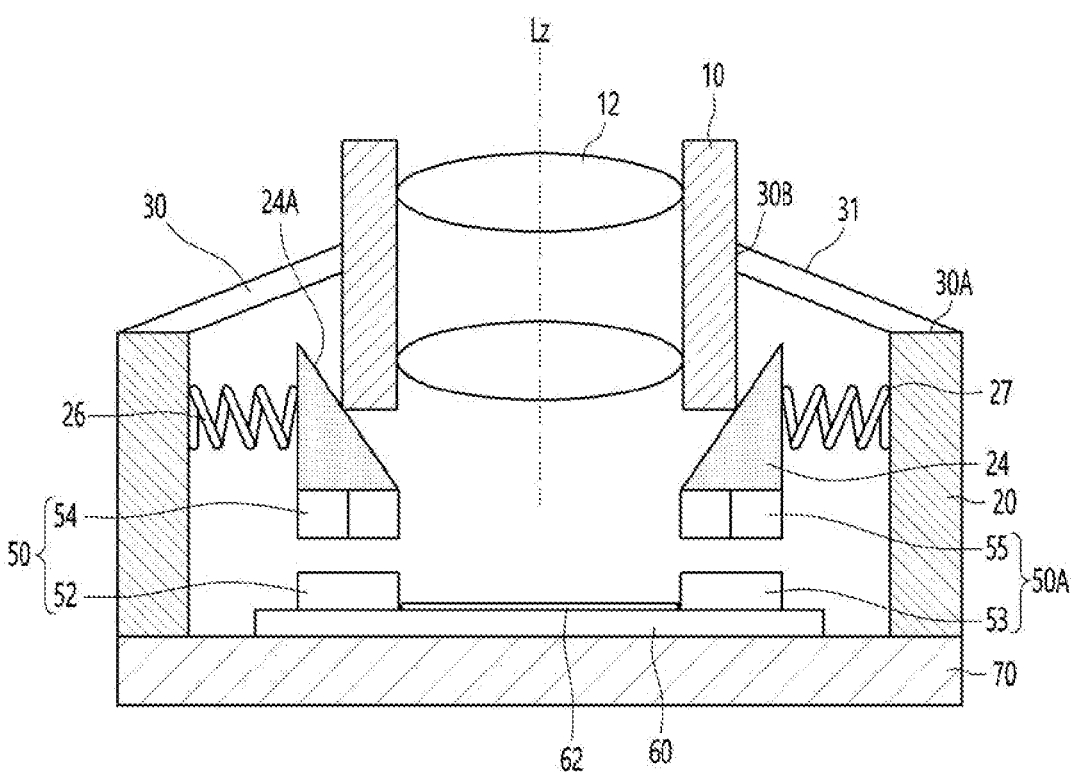
FIG. 2 is an example of auto-focusing of the camera module of FIG. 1.
Figure 3:
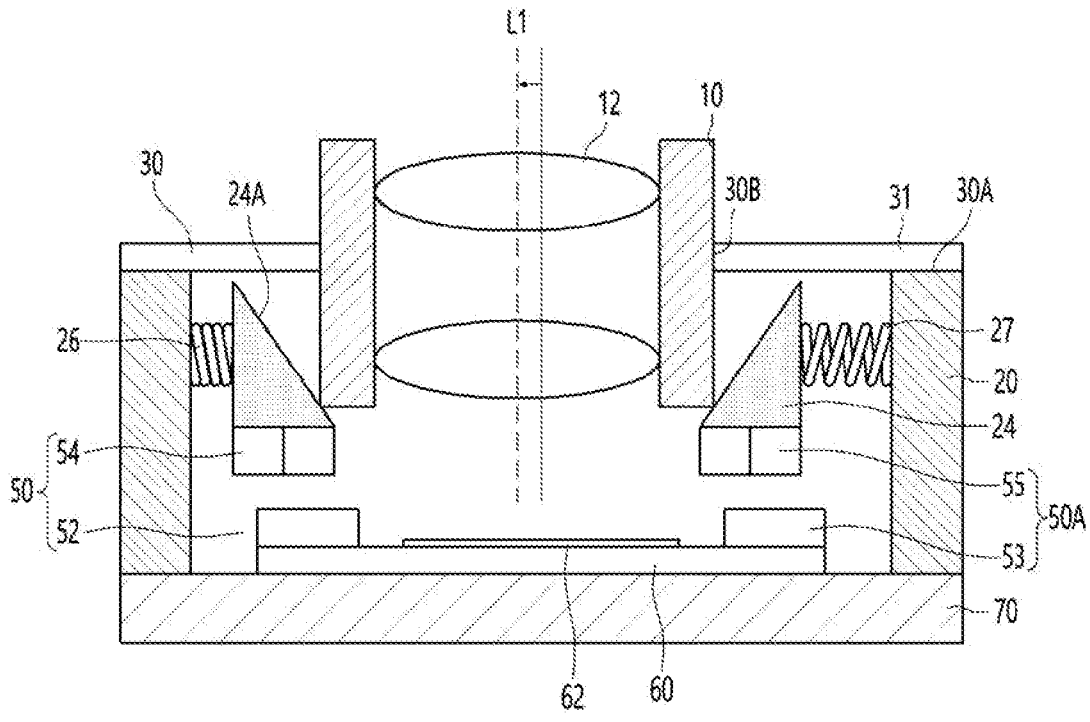
FIG. 3 is an example in which the lens holder is shifted in the camera module of FIG. 1.
Figure 4:
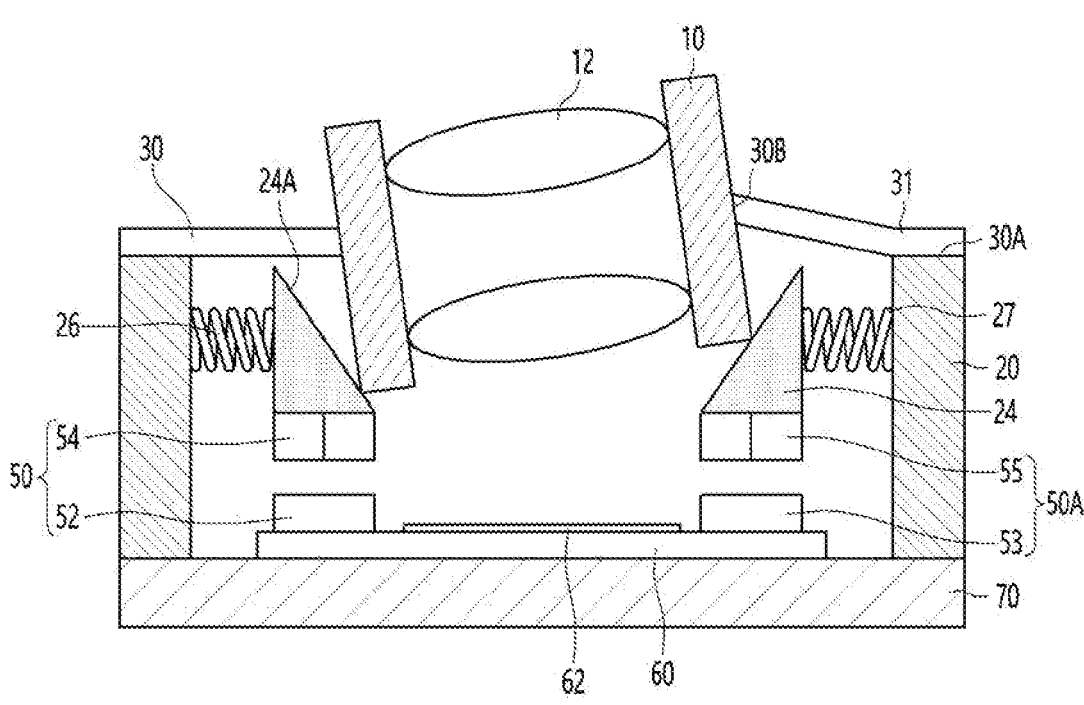
FIG. 4 is an example of tilting a lens holder in the camera module of FIG. 1.
Figure 5:
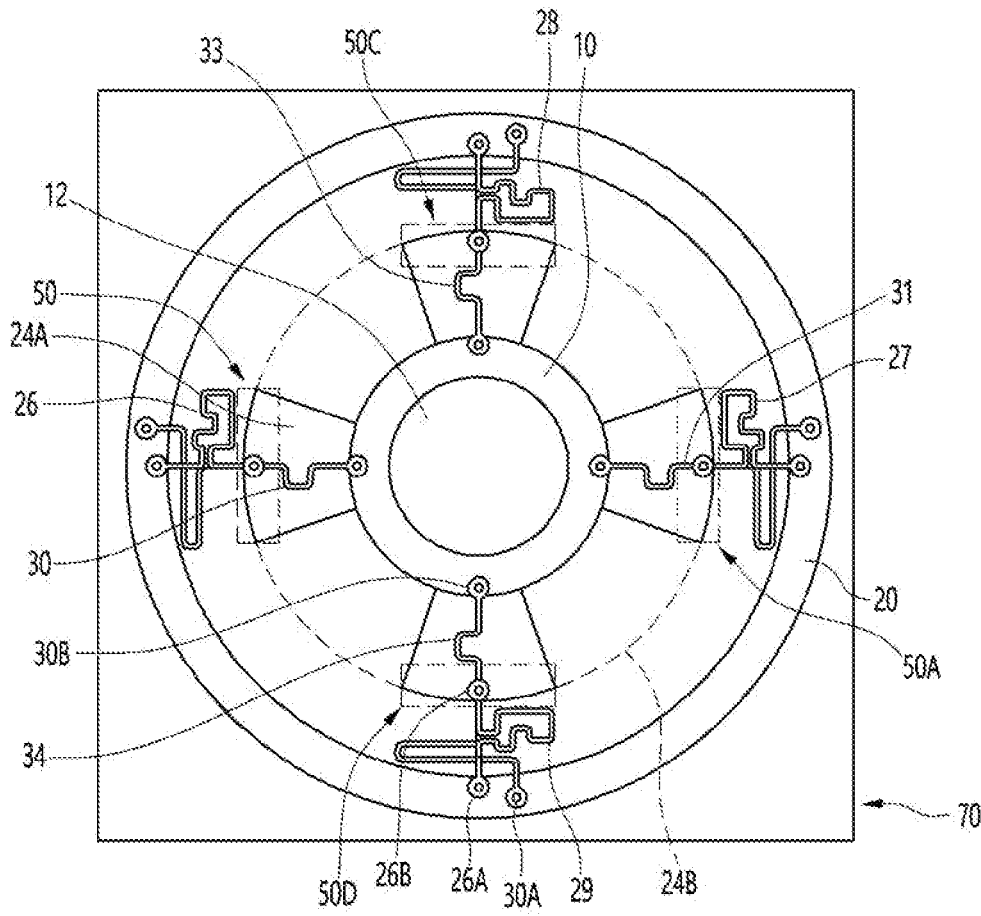
FIG. 5 is an example of a plan view of the camera module of FIG. 1.

FIG. 1 is a side cross-sectional view of a camera module according to an embodiment of the invention, FIG. 2 is an example of auto-focusing of the camera module of FIG. 1, FIG. 3 is an example showing a shifted state of the lens holder in the camera module of FIG. 1, FIG. 4 is an example of a tilt state of a lens holder in the camera module of FIG. 1, and FIG. 5 is an example of a plan view of the camera module of FIG. 1.

Referring to FIG. 1, a camera module according to an embodiment of the invention may include a lens holder 10 having at least one lens 12, a substrate 60 disposed under the lens holder an image sensor 62 disposed on the substrate 60, a first elastic springs 30 and 31 supporting an outside of the lens holder 10, a case 20 supporting the other end of the first elastic springs 30 and 31, at least one guide portion 24 for guiding driving of the lens holder 10, driving members 50 and for driving the lens holder 10, and second elastic springs 26 and 27 supporting the guide portion 24 to the case 20. The camera module may include a housing 70 supporting the case 20.

The lens holder 10 may have a through hole therein and include one or a plurality of lenses 12. The lens holder 10 may be defined as a lens barrel. Each of the plurality of lenses 12 may have an incident surface through which light is incident and an exit surface through which light is emitted, and may be aligned in an optical axis Lz. The plurality of lenses 12 may overlap the image sensor 62 along an optical axis Lz. At least one or all of the plurality of lenses 12 may be a plastic material, or the other one or all may be a glass material. The top view shape of the lens holder 10 may include a ring shape. At least one or all of the plurality of lenses 12 may have a circular shape, or at least another one may have a non-circular shape.

The first elastic springs 30 and 31 connect the lens holder 10 to the case 20 so as to be supported, and provide elasticity in at least two directions. Both ends 30A and 30B of the first elastic springs 30 and 31 may be connected to the lens holder 10 and the case 20, respectively. The at least two directions may include a direction of the optical axis Lz and at least one direction orthogonal to the direction of the optical axis Lz. A plurality of the first elastic springs 30 and 31 may be spaced apart from each other.

When the number of first elastic springs 30 and 31 is two, they may be respectively disposed on opposite sides of the lens holder 10. The first elastic springs 30 and 31 may include two, three, or four or more. The plurality of first elastic springs 30 and 31 may be equiangularly arranged with respect to the optical axis Lz. As shown in FIG. 5, when the four first elastic springs 31, 33, and 34 are disposed, they may be disposed equiangularly outside the lens holder 10. For example, the first elastic springs 30, 31, 33, and 34 may be spaced apart at an angle of 90 degrees with respect to the optical axis Lz.

As shown in FIG. 1, the one end 30B of the first elastic springs 30 and 31 may be connected to the outside of the lens holder 10, and the other end 30A may be connected to a part of the case 20. When the lens holder 10 moves in a direction of the optical axis Lz, moves in a horizontal direction perpendicular to the optical axis Lz, and tilts with respect to the optical axis Lz, the first elastic springs 30 and 31 may provide elasticity to move and support the lens holder 10. The tilt movement of the lens holder 10 may be a state in which the heights of lower ends of the lens holder 10 are different from each other or the heights of upper ends of the lens holder 10 are moved differently from each other. The first elastic springs 30 and 31 may include coiled springs or plate-shaped springs. The one end 30B of the first elastic springs 30 and 31 may be disposed at an upper end or an outer center of the lens holder 10.

The substrate 60 is disposed on the housing 70, and an image sensor 62 may be disposed thereon. The image sensor 62 may convert light incident through the lens 12 into an electrical signal. The image sensor 62 may be any one of CCD (charge coupled device), CMOS (complementary metal-oxide semiconductor), CPD, and CID. A plurality of image sensors 62 may be arranged, one of which may be a color (RGB) sensor, and the other may be a black and white sensor. The image sensor 62 may be disposed on a substrate 60. In the image sensor 62, the ratio of the length of the long side to the length of the short side may be 4:3 or 16:9. The substrate 60 may include FPCB.

An optical filter (not shown) may be disposed on the image sensor 62, and the optical filter may protect the image sensor 62. The optical filter may be an infrared filter, and may block infrared light from being incident on the image sensor 62. The optical filter may be formed by coating an infrared blocking coating material on a flat plate-shaped optical filter such as a cover glass for protecting an imaging surface or a cover glass. The optical filter may be an infrared absorption filter or an infrared reflection filter.

Here, the camera module may further include an internal lens holder having other lens(s) between the image sensor 62 and the lens holder 10 having the lens 11 closest to the object side. The inner lens holder may be moved in an optical axis direction or/and a horizontal direction by another driving member.

The case 20 is disposed around the outer circumference of the lens holder 10, and supports and guides the other ends

30A of the first elastic springs 30 and 31. A lower end of the case 20 may be disposed on the housing 70 along an outer side of the image sensor 62. The housing 70 may be disposed below the substrate 60 and the housing 70, and may support the entirety of the camera module.

The guide portion 24 may be disposed under the lens holder 10. The guide portion 24 may be supported by the case 20 through the second elastic springs 26 and 27. The guide portion 24 may be disposed in different regions between the lower portion of the lens holder 10 and the case 20. That is, the plurality of guide portions 24 may be disposed on opposite sides of each other. The inner side surface 24A of the guide portion 24 may be provided as an inclined surface at the lower portion of the lens holder 10. One ends of the second elastic springs 26 and 27 may be connected to the guide portion 24 and the other end may be connected to the case 20. As shown in FIGS. 2 to 4, the second elastic springs 26 and 27 may be tensioned or restored to provide reciprocating movement in the direction of the optical axis Lz or/and horizontal direction with respect to the outside of the guide portion 24. Two, three, or four or more second elastic springs 26 and 27 may be disposed outside the guide portion 24. The plurality of second elastic springs 26 and 27 may be equiangularly arranged with respect to the optical axis Lz. The two second elastic springs 26 and 27 may be respectively disposed on opposite sides of the guide portion 24. As shown in FIG. 5, the four second elastic springs 26, 27, 28, and 29 may be disposed at an angle of 90 degrees with respect to the optical axis Lz. The second elastic springs 26 and 27 may include coiled springs or plate-shaped springs.

The guide portion 24 is provided with an inner side surface 24A inclined at a predetermined angle with respect to an axis parallel to the optical axis Lz, and the angle may range from 30 degrees to 60 degrees or from 30 degrees to 45 degrees. In the guide portion 24, an interval between inner side surfaces 24A facing each other may become narrower from the upper end toward the lower end. The guide portion 24 may have a narrower distance or diameter as the distance between the inner side surfaces 24A facing each other goes from the upper end to the lower end. In the guide portion 24, a distance between inner side surfaces 24A facing each other may be smaller toward the image sensor 62 from the lens 12. The lower end of the lens holder 10 may be disposed or brought into contact with the inner side surface 24A of the guide portion 24. The guide portion 24 may be disposed at a position spaced apart from the substrate 60. A lower surface of the guide portion 24 may be spaced apart from the substrate 60.

The top view shape of the guide portion 24 may be circular, or a plurality of guide portions 24 may be disposed along the circumference. A plurality of guide portions 24 may be disposed spaced apart from each other along the lower portion of the lens holder 10. As for the diameter of the plurality of guide portions 24, the virtual diameter connecting the upper ends of the plurality of guide portions 24 may be the largest and the virtual diameter connecting the lower ends of the plurality of guide portions 24 may be the smallest. The height of the inner side surfaces 24A of the guide portions 24 may gradually decrease from the upper end toward the lower end.

In the guide portions 24, a minimum width between the inner side surfaces 24A facing each other may be smaller than an outer diameter of the lens holder 10. The length W1 of each of the inner side surfaces 24A of the guide portions 24 in the radial direction may be greater than or equal to 0.3 mm, for example, in the range of 0.3 mm to 1 mm or in the range of 0.4 mm to 0.7 mm. Accordingly, even when the lens holder 10 is moved, the guide portions 24 may support the lower end of the lens holder 10 by the length W1 and the height of each of the inner side surfaces 24A. For example, each of the plurality of guide portions 24 may be supported by second elastic springs 26 and 27, respectively. The plurality of first elastic springs 30 and 31 and the plurality of second elastic springs 30 and 31 support the lens holder 10 and the guide portions 24, which are different support objects by individual elastic modulus, and drive the lens holder 10 in different axial directions through the flow of the guide portions 24 due to the difference in elastic modulus between them.

A plurality of driving members 50 and 50A may be disposed below the guide portion 24. Each of the plurality of driving members 50 and 50A may include stators 52 and 53 and movers 54 and 55. The stators 52 and 53 may be disposed on the substrate 60. The plurality of movers 54 and 55 may be disposed on the guide portions 24. The plurality of stators 52 and 53 are respectively disposed in different regions of the upper surface of the substrate 60 and may face the lower surface of each of the guide portions 24. The movers 54 and 55 may be disposed in different regions of the guide portions 24 or on a lower portion of each of the guide portions 24.

The plurality of driving members 50 and 50A may be respectively disposed on the lower surface of each of the guide portions 24. The stators 52 and 53 may be coils, and the movers 54 and 55 may be magnets. The stators 52 and 53 and the movers 54 and 55 may face each other in the direction of the optical axis Lz. As another example, the stators 52 and 53 and the movers 54 and 55 may face each other in a horizontal direction. As another example, the plurality of driving members 50 and 50A may be disposed on the lens holder 10 and the substrate 60, and one or more movers 54 and 55 may be disposed around the lens holder 10, that is, on the lower side or/and the outer side of the lens holder 10. The plurality of driving members 50 and 50A are driving means having different functions, and may include an actuator for auto focus, an actuator for OIS, and an actuator for tilt.

The driving members 50 and 50A according to an embodiment of the invention may solve the problem of increasing the magnet due to an auto-focus stroke when the magnet is used as a stator in the background art by using the movers 54 and 55. In addition, since the magnets is arranged as the movers 54 and 55, when the magnets are arranged as a stator, it is possible to prevent the problem of increasing the length of the magnets. As shown in FIG. 5, two, three, or four or more driving members 50, 50A, 50C, and 50D may be arranged at an equal angle with respect to the optical axis Lz, for example, four driving members 50, 50A, 50C and 50D may be disposed at an angle of 90 degrees with respect to the optical axis Lz.

As shown in FIG. 2, when power is supplied to the coils of the stators 52 and 53 of the driving members 50 and 50A, electromagnetic force is generated between the stators 52 and 53 and the movers 54 and 55. The lens holder 10 may be raised in the optical axis direction. At this time, the movers 54 and 55 and the guide portion 24 move toward the optical axis Lz by the electromagnetic force of the driving members 50 and 50A, and the lower end of the lens holder 10 may be raised toward a higher height or a subject along the inner side surfaces 24A of the guide portions 24. The first elastic springs 30 and 31 may support the movement of the lens holder 10 and provide elasticity. The second elastic springs 26 and 27 may support the movement of the guide portions 24 and provide elasticity. Accordingly, the lens holder 10 may be moved up toward the object side. Conversely, when the polarity of the power supply is reversed, it may be restored to its original position. At this time, it may be moved to the original position by using a hall sensor (not shown) around the lens holder 10. The hall sensor may be disposed at the center of each coil.

As shown in FIG. 3, when power is supplied to the coils of the stators 52 and 53 of the driving members 50 and 50A, electromagnetic force is generated between the stators 52 and 53 and the movers 54 and 55, and at this time, the lens holder 10 may be moved from the optical axis Lz in a horizontal direction, that is, in a left (front) or right (rear) direction by a predetermined distance Ll. At this time, the movers 54 and 55 and the guide portion 24 may move in a horizontal direction, that is, left (front) or right (rear) direction with respect to the optical axis Lz, and the second elastic springs 26 and 27 may support the movement of the guide portions 24 and provide elasticity. Accordingly, the driving members 50 and 50A and the guide portions 24 may move the lens holder 10 in a direction (i.e., a horizontal direction) perpendicular to the optical axis Lz. Conversely, when the polarity of the power supply is reversed, it may be restored to its original position. At this time, the coil around the lens holder may be moved to its original position by using a hall sensor.

As shown in FIG. 4, when power is supplied to the coils of the stators 52 and 53 of the driving members 50 and 50A, electromagnetic force is generated between the stators 52 and 53 and the movers 54 and 55, and at this time, the lens holder 10 may be tilted in a direction in which a lower end of one side is down and the lower end of the other side is up. At this time, the first mover 54 and the guide portion 24 located on the left side are properly positioned by the electromagnetic force of the plurality of driving members 50 and 50A, and the second mover 55 and the guide portion 24 located on the right side will move in the inward direction. At least one of the plurality of guide portions 24 may be moved differently due to the difference in electromagnetic force between the first mover 54 and the first stator 52 and the electromagnetic force between the second mover 55 and the second stator 53. Accordingly, the lower surface of the lens holder 10 may be tilted, the height of the lower end of the left side of the lens holder 10 may be lowered, and the height of the upper end of the right side of the lens holder 10 may be higher. At this time, the first elastic springs 30 and 31 may support the lens holder 10 and provide elasticity, and the second elastic springs 26 and 27 may support the movement of the guide portion 24 and provide elasticity. Accordingly, the lens holder 10 may be tilted to have different heights based on the optical axis Lz. Conversely, when the polarity of the power supply to the coil is reversed, it may be restored to its original position. At this time, the coil around the lens holder 10 may be moved to its original position by using a hall sensor (not shown).

The camera module according to an embodiment of the invention stably may move the position of the lens 11 or the lens holder 10 in different axial directions by the plurality of guide portions 24 having inclined inner side surfaces 24A. Accordingly, the movement of the movers 54 and 55 of the driving members 50 and 50A may be reduced and the moving distance of the object may be increased. Also, since the amount of AF stroke may be increased by adjusting the inclination angle, the size of the module may be reduced. In addition, by driving the lens holder 10 to enable movement of the optical axis, two axis directions perpendicular to the optical axis, and tilt movement, the lens or lens holder may be moved in multi-axis directions.

The camera module according to an embodiment of the invention may be driven for auto focus, horizontal movement, or/and tilt the lens holder 10 using at least one driving member 50 and 50A, the first elastic springs 30 and 31, the guide portions 24 and the second elastic springs 26 and 27.

The camera module according to an embodiment of the invention may have two or three or more numbers of a plurality of guide portions 24, the plurality of driving members 50 and 50A, the first elastic springs 30 and 31 and the second elastic springs 26 and 27, and may be provided in the same number. The plurality of driving members 50 and 50A are individually driven, and move the lens holder 10 in at least one direction together with the plurality of guide portions 24, and the first elastic springs 30 and 31 and the second elastic springs 26 and 27 provide elasticity according to movement and may support the lens holder 10.

As shown in FIG. 5, a portion of each of the plurality of first elastic springs 30, 31, 33, and 34 may overlap a portion of each of a plurality of second elastic springs 26, 27, 28, and 29 in the optical axis direction. A portion of each of the plurality of first elastic springs 30, 31, 33, and 34 may overlap the plurality of guide portions 24 in the optical axis direction. the both ends 30A and 30B of each of the plurality of first elastic springs 30, 31, 33, and 34 are connected between the case 20 and the lens holder 30, and may include a buffer structure with a multi-stage bend or buffered shaped on an outer side, for example, one side or/and the other side of a straight line connecting the both ends 30A and 30B. The both ends 26A and 26B of each of the second elastic springs 26, 27, 28, and 29 are connected between the case 20 and the plurality of guide portions 24, respectively, and may include a buffer structure having a multi-stage bend or a buffer shape on the outer side, for example, one side or/and the other side of a straight line connecting the both ends 30A and 30B. A virtual circle 24B connecting the ends 26B of the second elastic springs 26 and 27 may be disposed to overlap with the plurality of guide portions 24 to support the up/down, left/right, front/rear movement of each of the plurality of guide portions 24. Since each of the plurality of first elastic springs 30, 31, 33, and 34 and the plurality of second elastic springs 26, 27, 28, and 29 are provided in a form having a buffer structure along a line, they may be tensioned or restored. As another example, the plurality of first elastic springs 30, 31, 33, and 34 and the plurality of second elastic springs 26, 27, 28, and 29 may be arranged at positions where they do not overlap each other.

Figure 6:
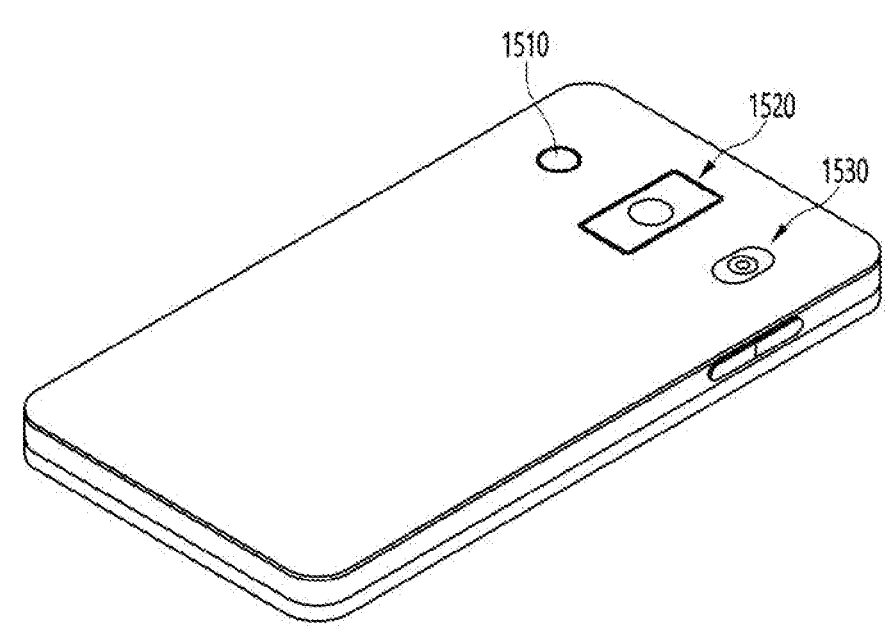
FIG. 6 is an example of a moving device having the camera module of FIG. 1.

FIG. 6 is a perspective view illustrating an example of a moving device to which a camera module according to an embodiment of the invention is applied. As shown in FIG. 6, a mobile terminal 1500 may include a camera module 1520, a flash module 1530, and an autofocus device 1510 provided on one side or rear side. Here, the auto focus device 1510 may include a surface emitting laser device and a light receiver as a light emitting layer. The flash module 1530 may include an emitter emitting light therein. The flash module 1530 may be operated by operating a camera of a mobile terminal or by a user's control. The camera module 1520 may include an image capturing function and an auto focus function. For example, the camera module 1520 may include an auto focus function using an image. The auto focus device 1510 may include an auto-focus function using a laser. The auto focus device 1510 may be mainly used in a condition in which an auto-focus function using an image of the camera module 1520 is degraded, for example, a proximity of 10 m or less or a dark environment.

The above detailed description should not be construed as limiting in all respects and should be considered illustrative. The scope of the embodiments should be determined by reasonable interpretation of the appended claims, and all changes within the equivalent range of the embodiments are included in the scope of the embodiments.

The invention claimed is:

1. A camera module comprising:

a lens holder having at least one lens;

a case spaced apart from an outer side of the lens holder;

a plurality of first elastic springs having one end connected to the lens holder and an other end connected to the case;

a plurality of driving members disposed around a lower portion of the lens holder;

a plurality of guide portions having an inner side surface facing the lower portion of the lens holder and arranged along an outer periphery of the lens holder; and a plurality of second elastic springs connecting each of the plurality of guide portions to different positions of the case, wherein each of the plurality of driving members includes a stator and a mover disposed on each of the plurality of guide portions and facing the stator, wherein the inner side surfaces of the plurality of guide portions are inclined with respect to an optical axis of the lens, wherein the inner side surfaces of the plurality of guide portions overlap with the lens holder in a direction of the optical axis of the lens, wherein the inner side surfaces of each of the plurality of guide portions overlap with the lens holder in a direction perpendicular to the optical axis, and wherein each of the inner side surfaces of the plurality of guide portions is inclined in a range of 30 degrees to 60 degrees relative to the optical axis.

2. The camera module of claim 1, wherein the second elastic springs are located between the plurality of guide portions and the case, wherein each of the plurality of stators is a coil, and wherein each of the plurality of movers is a magnet.

3. The camera module of claim 1, wherein the inner side surface of each of the plurality of guide portions has the inclined inner side surface with an upper end higher than a lower end, and wherein the inner side surfaces of the plurality of guide portions face each other in the direction perpendicular to the optical axis, and a distance between the upper ends of the inner side surfaces facing each other is larger than a distance between the lower ends in the direction perpendicular to the optical axis.

4. The camera module of claim 1, wherein the plurality of first elastic springs is three or four, and wherein the plurality of second elastic springs is three or four.

5. The camera module of claim 1, comprising: a substrate; and an image sensor aligned on the substrate in the optical axis with the lens.

6. The camera module of claim 1, wherein the lens holder is moved up or down in the direction of the optical axis by the driving members.

7. The camera module of claim 6, wherein the lens holder is moved in a horizontal direction based on the optical axis by the driving members, and wherein the horizontal direction is the direction perpendicular to the optical axis.

8. The camera module of claim 7, wherein the lens holder is tilted based on the optical axis by the driving member.

9. The camera module of claim 1, wherein the inner side surface of each of the guide portions has a radial length ranging from 0.4 mm to 0.7 mm.

10. A moving device having a camera module according to claim 1.

11. The camera module of claim 1, wherein the plurality of first elastic springs is arranged at an equilateral angle along an outer side of the lens holder with respect to the optical axis of the lens.

12. The camera module of claim 11, wherein the plurality of first elastic springs is spaced apart at an angle of 90 degrees based on the optical axis.

13. The camera module of claim 11, wherein the plurality of second elastic springs arranged at an equilateral angle with respect to the optical axis.

14. A camera module comprising:

a substrate having an image sensor;

a lens holder disposed on the image sensor and having a plurality of lenses;

a case disposed around the lens holder;

a plurality of first elastic springs connected between the lens holder and the case;

a plurality of guide portions disposed between the lens holder and the case;

a plurality of driving members for driving each of the plurality of guide portions; and a plurality of second elastic springs connected between each of the plurality of guide portions and the case, wherein each of the plurality of driving members is individually driven, wherein each of the plurality of guide portions includes an inner surface inclined with respect to an optical axis of the lenses, wherein each of the inner surfaces faces a lower surface of the lens holder and has a region spaced apart from the lower surface of the lens holder, wherein each of the plurality of guide portions has the inclined inner side surface overlapping a lower end of the lens holder in a direction of the optical axis, wherein the plurality of driving members includes a plurality of stators disposed on the substrate and a plurality of movers facing each of the plurality of stators and coupled to each of the plurality of guide portions, wherein a number of each of the plurality of guide portions, each of the plurality of driving members, each of the first elastic springs and each of the second elastic springs is two or more, and is disposed in a same number as each other, and wherein each inner side surface of each of the plurality of guide portions is inclined in a range of 30 degrees to 60 degrees relative to the optical axis.

15. The camera module of claim 14, wherein the plurality of first elastic springs is equiangularly disposed with respect to the optical axis of the lenses, and wherein the plurality of second elastic springs is equiangularly disposed with respect to the optical axis.

16. The camera module of claim 14, wherein the second elastic springs are located between the plurality of guide portions and the case, wherein each of the plurality of stators is a coil, and wherein each of the plurality of movers is a magnet.

17. The camera module of claim 14, wherein the inner side surfaces of the plurality of guide portions are opposed to each other based on the lens holder, and wherein the lens holder is up or down in the direction of the optical axis by the driving members.

* * * * *